(12) United States Patent
Addagatla et al.

(10) Patent No.: US 11,884,410 B2
(45) Date of Patent: Jan. 30, 2024

(54) DUAL FUNCTION LINKS FOR GAS TURBINE ENGINE MOUNTS

(71) Applicant: General Electric Company, Schenectady, NY (US)

(72) Inventors: Srinivas Addagatla, Gebeze (TR); Ravindra Shankar Ganiger, Bengaluru (IN); Anil Soni, Bengaluru (IN); Sharad Tiwari, Gebeze (TR); Jonathan E. Coleman, Evendale, OH (US)

(73) Assignee: General Electric Company, Schenectady, NY (US)

( * ) Notice: Subject to any disclaimer, the term of this patent is extended or adjusted under 35 U.S.C. 154(b) by 73 days.

(21) Appl. No.: 17/665,286

(22) Filed: Feb. 4, 2022

(65) Prior Publication Data

US 2023/0249838 A1 Aug. 10, 2023

(51) Int. Cl.
*B64D 27/26* (2006.01)
*F01D 25/28* (2006.01)

(52) U.S. Cl.
CPC ............ *B64D 27/26* (2013.01); *F01D 25/28* (2013.01); *B64D 2027/262* (2013.01); *B64D 2027/268* (2013.01); *F05D 2220/323* (2013.01); *F05D 2240/90* (2013.01)

(58) Field of Classification Search
CPC ................................. F01D 25/28; B64D 27/26
See application file for complete search history.

(56) References Cited

U.S. PATENT DOCUMENTS

| | | | | |
|---|---|---|---|---|
| 5,620,154 | A * | 4/1997 | Hey ........................ | B64D 27/18 60/797 |
| 5,921,500 | A * | 7/1999 | Ellis ........................ | B64D 27/20 60/797 |
| 5,927,644 | A * | 7/1999 | Ellis ........................ | B64D 27/26 60/797 |
| 7,909,302 | B2 | 3/2011 | Audart-Noel et al. | |
| 8,613,404 | B2 | 12/2013 | Lafont et al. | |
| 9,856,028 | B2 * | 1/2018 | Wu ......................... | B64D 27/18 |
| 2013/0074517 | A1 | 3/2013 | Suciu et al. | |
| 2014/0061426 | A1 * | 3/2014 | Zheng .................... | B64D 27/26 248/554 |
| 2020/0385132 | A1 | 12/2020 | Deforet et al. | |
| 2021/0010424 | A1 * | 1/2021 | West ....................... | F02C 7/20 |

FOREIGN PATENT DOCUMENTS

| | | |
|---|---|---|
| EP | 2137072 | 5/2017 |
| FR | 2972709 | 9/2012 |
| FR | 3049264 | 9/2017 |
| WO | 2018233860 | 12/2018 |

\* cited by examiner

*Primary Examiner* — Woody A Lee, Jr.
*Assistant Examiner* — Cameron A Corday
(74) *Attorney, Agent, or Firm* — Hanley, Flight & Zimmerman, LLC

(57) ABSTRACT

Dual function links for gas turbine engine mounts are disclosed. An example apparatus for mounting a casing of a gas turbine engine to a pylon, the apparatus includes a first pin and a linkage including a first linkage portion including the first pin, a second linkage portion, the second linkage portion forming a first load path between the gas turbine engine and the pylon, the second linkage portion arranged with respect to the first linkage portion such that a gap prevents the first linkage portion from forming a second load path between the gas turbine engine and the pylon.

20 Claims, 6 Drawing Sheets

DUAL FUNCTION LINKS FOR GAS TURBINE ENGINE MOUNTS

FIELD OF THE DISCLOSURE

This disclosure relates generally to gas turbines, and, more particularly, to dual function links for gas turbine engine mounts.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section. A gas turbine engine produces a thrust that propels a vehicle forward, e.g., a passenger aircraft. The thrust from the engine transmits loads to a wing mount, e.g., a pylon, and, likewise, the vehicle applies equal and opposite reaction forces onto the wing via mounts.

BRIEF DESCRIPTION OF THE DRAWINGS

A full and enabling disclosure of the present invention, including the best mode thereof, directed to one of ordinary skill in the art, is set forth in the specification, which makes reference to the appended Figures, in which.

Figure 1:
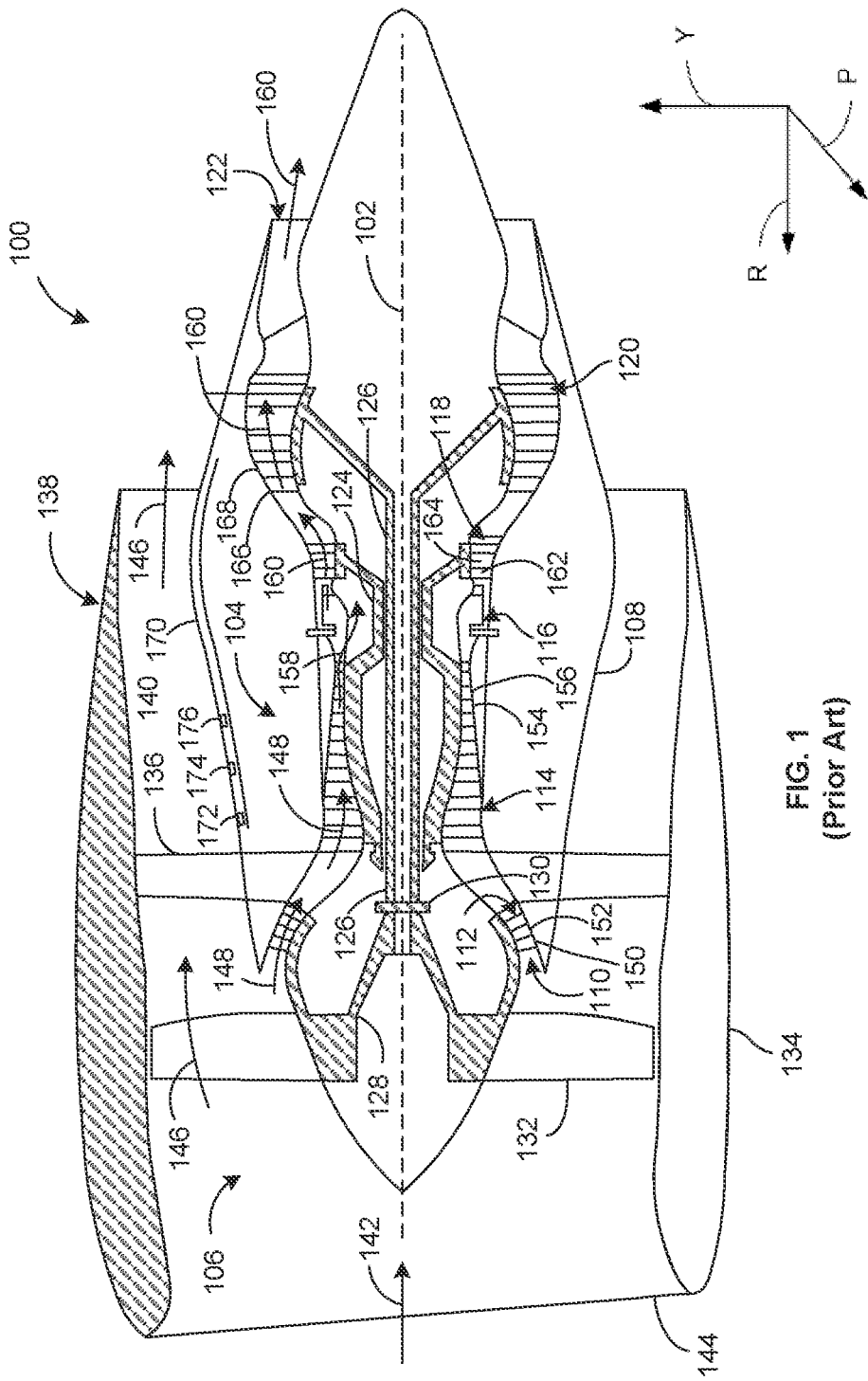
FIG. 1 illustrates a cross-sectional view of a prior gas turbine engine.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, joined, detached, decoupled, disconnected, separated, etc.) are to be construed broadly and may include intermediate members between a collection of elements and relative movement between elements unless otherwise indicated. As used herein, the term "decouplable" refers to the capability of two parts to be attached, connected, and/or otherwise joined and then be detached, disconnected, and/or otherwise non-destructively separated from each other (e.g., by removing one or more fasteners, removing a connecting part, etc.). As such, connection/disconnection references do not necessarily infer that two elements are directly connected and in fixed relation to each other. Stating that any part is in "contact" with another part means that there is no intermediate part between the two parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Known mounts for gas turbine engines include standalone fail-safe linkages for engine mounts that extend between the mount yoke and/or pylon and the casing of the gas turbine engine. In some examples, these failsafe linkages prevent failures of individual linkages of the mount from causing the gas turbine engine from completely decoupling from the pylon. Examples disclosed herein include dual function links which mitigate the need for standalone center fail-safe links allowing decreasing the packaging space requirement and weight of the mount system. Example mounts disclosed herein include a dual-linkage arrangement with integrated fail-safe linkages. In some examples disclosed herein, the mount includes a three-pin linkage (e.g., a fixed link, etc.) and a two-pin linkage (e.g., a swing link, etc.) and corresponding fail-safe linkages (e.g., a first fail-safe linkage associated with the three-pin linkage, a second fail-safe linkage associated with a two-pin linkage, etc.).

The terms "upstream" and "downstream" refer to the relative direction with respect to fluid flow in a fluid pathway. For example, "upstream" refers to the direction from which the fluid flows, and "downstream" refers to the direction to which the fluid flows.

Various terms are used herein to describe the orientation of features. As used herein, the orientation of features, forces and moments are described with reference to the yaw axis, pitch axis, and roll axis of the vehicle associated with the features, forces and moments. In general, the attached figures are annotated with reference to the axial direction, radial direction, and circumferential direction of the gas turbine associated with the features, forces and moments. In general, the attached figures are annotated with a set of axes including the roll axis R, the pitch axis P, and the yaw axis Y. As used herein, the terms "longitudinal," and "axial" are used interchangeably to refer to directions parallel to the roll axis. As used herein, the term "lateral" is used to refer to directions parallel to the pitch axis. As used herein, the term "vertical" and "normal" are used interchangeably to refer to directions parallel to the yaw axis.

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.). As used herein, the term "linkage" refers to a connection between two parts that restrain the relative motion of the two parts (e.g., restrain at least one degree of freedom of the parts, etc.). "Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Most gas turbine engine architectures include mounts with three point standalone connections on the gas turbine engine structure or frame to a pylon of an aircraft. In some examples, these mounts constrain three degrees of freedom (DOF) (e.g., lateral loads, vertical loads, and moments about the roll axis, etc.) of the coupled gas turbine engine and can include a stand-alone failsafe linkage. In some examples, the failsafe linkage does not act as a load path between the gas turbine engine and the pylon unless there is a failure in the prior connections. However, the inclusion of a standalone fail-safe connection can reduce the packaging space between the gas turbine engine and the pylon and/or the other components of the engine mounts. Additionally, the inclusion of the standalone fail-safe connection reduces the number of frame struts to support the mounts on gas turbine engine.

Examples disclosed herein overcome the above-referenced deficiencies via an engine mounting configuration that allows the omission of a standalone fail-safe connection. Some of the engine mounts disclosed herein include links with a primary load path portion and an integrated fail-safe portion. Some of the engine mounts disclosed herein include a three-pin linkage (e.g., a fixed link, etc.) and a two-pin linkage (e.g., a swing link, etc.) and corresponding fail-safe linkages (e.g., a first fail-safe linkage associated with the three-pin linkage, a second fail-safe linkage associated with a two-pin linkage, etc.). In some examples disclosed herein, the engine mounts react three degrees of freedom between the pylon and the gas turbine engine (e.g., the rotation about the roll axis, vertical loads, lateral loads, etc.). Some of the examples disclosed herein reduce the packaging space and weight of engine mount configurations and facilitate the elimination of standalone fail-safe linkage attachments.

Referring now to the drawings, wherein identical numerals indicate the same elements throughout the figures, FIG. 1 is a schematic cross-sectional view of a prior turbofan 100. As shown in FIG. 1, the turbofan 100 defines a longitudinal or axial centerline axis 102 extending therethrough for reference. In general, the turbofan 100 may include a core turbine 104 or gas turbine engine disposed downstream from a fan section 106.

The core turbine 104 generally includes a substantially tubular outer casing 108 ("turbine casing 108") that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106 ("fan shaft 128"). In some examples, the LP shaft 126 may couple directly to the fan shaft 128 (i.e., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106. FIG. 1 further includes a cowling 170 and offset-arch gimbals 172, 174, 176. The cowling 170 is a covering which may reduce drag and cool the engine. The offset-arch gimbals 172, 174, 176 may, for example, include infrared cameras to detect a thermal anomaly in the under-cowl area of the turbofan 100.

Figure 2:
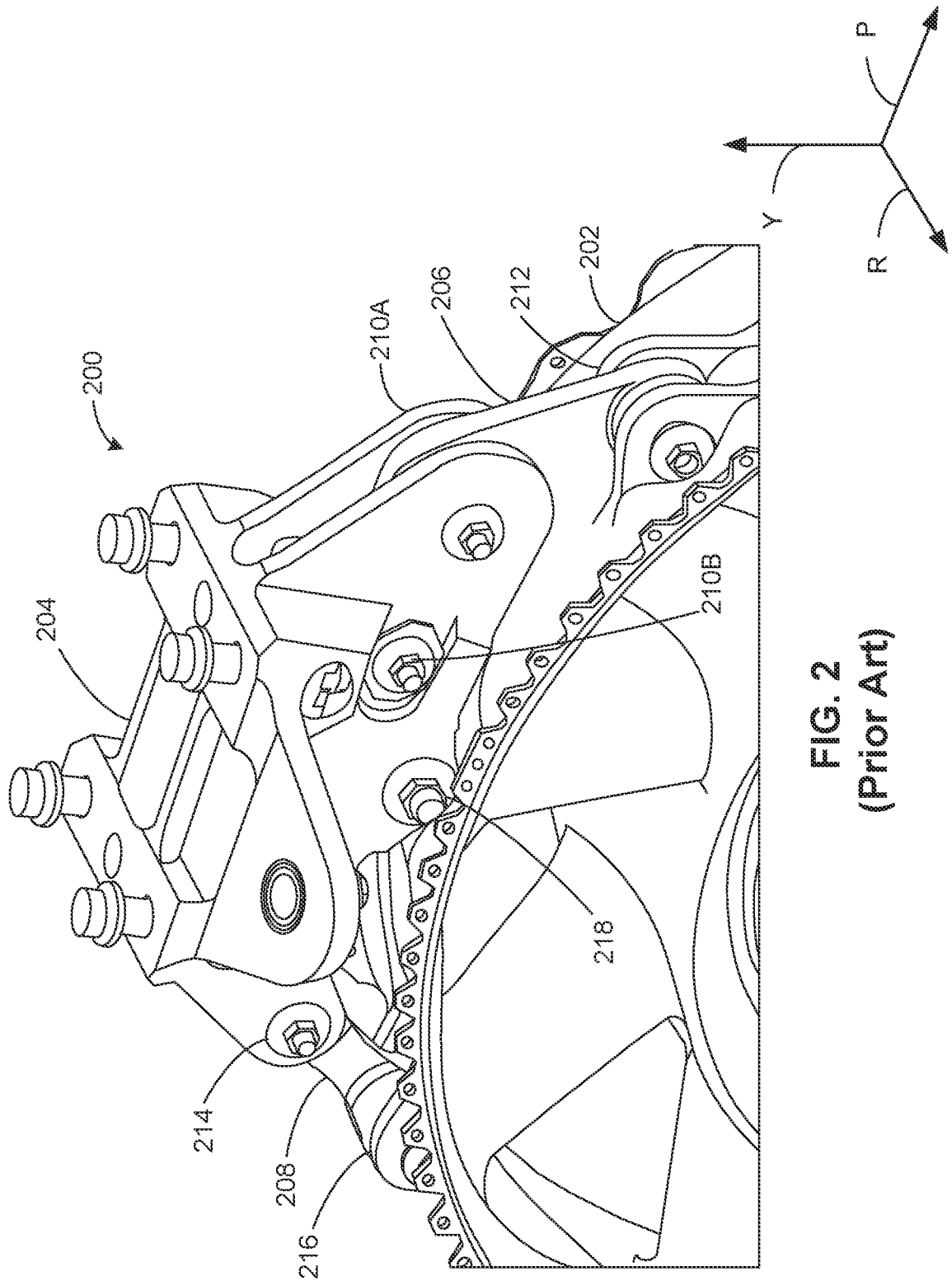
FIG. 2 illustrates a prospective view of a prior rear mount that can be used to mount the engine of FIG. 1 to a pylon.

FIG. 2 illustrates a prospective view of a prior rear mount 200 that can be used to mount an engine casing 202 to a pylon (not illustrated). In FIG. 2, the mount 200 includes a yoke 204, a first linkage 206, and a second linkage 208. The first linkage 206 includes a first yoke pin 210A, a second yoke pin 210B, and a first casing pin 212. The second linkage 208 includes a third yoke pin 214 and a second casing pin 216. In FIG. 2, the mount 200 additionally includes a failsafe linkage 218 (e.g., a waiting linkage, etc.).

In FIG. 2, the first linkage 206 is a three-pin linkage (e.g., a fixed link, etc.) and the second linkage 208 is a two-pin linkage (e.g., a swing link, etc.). In FIG. 2, the first linkage 206, the yoke 204 and the first yoke pin 210A form a first clevis, the first linkage 206, the yoke 204, and the second yoke pin 210B form a second clevis, and the first linkage 206, the engine casing 202 and the first casing pin 212 form a third clevis. The first clevis, the second clevis, and the third clevis collectively couple the yoke 204 and the engine casing 202 via the first linkage 206. Similarly, the second linkage 208, the yoke 204 and the third yoke pin 214 form a fourth clevis and the second linkage 208, the yoke 204 and the second casing pin 216 form a fifth clevis. The fourth clevis and the fifth clevis collectively couple the yoke 204 and the engine casing 202 via the second linkage 208.

The rear mount 200 constrains three degrees of freedom of the coupled gas turbine engine. For example, the rear mount 200 reacts to vertical loads (a first degree of freedom), lateral loads (a second degree of freedom), and moments about the roll axis (a third degree of freedom). The rear mount 200 can be used in conjunction with other engine mounts to fully constrain six degrees of freedom of the coupled gas turbine engine. In some such examples, imbalances in vertical and/or lateral loads between the mount 200 and the other engine mounts can be used to react pitch and/or yaw moments applied to the gas turbine engine.

If the first linkage 206 and/or the second linkage 208 fail during operation of the turbofan 100 (FIG. 1), the failsafe linkage 218 ensures the engine casing 202 remains coupled to the yoke 204, preventing damage to the turbofan 100 and/or preventing potential harm to uses of the turbofan 100. In the illustrated example, the failsafe linkage 218 reduces the packaging space between the yoke 204 and the engine casing 202, as it prevents other components from being placed in the area occupied by the failsafe linkage 218 and associated hardware. In some examples, the failsafe linkage 218 can require additional struts and/or support members, which increases the weight of the mount 200.

The following examples refer to gas turbine engines and mounting configurations that may be incorporated into a vehicle. For example, the engine may be an aeronautical engine incorporated into an aircraft. Alternatively, however, the engine may be any other suitable type of engine for any other suitable aircraft. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any suitable configuration, such as any other suitable number or arrangement of shafts, compressors, turbines, fans, etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of engine, such as reciprocating engines.

The following examples refer to gas turbine engines and mounting configurations that are similar to those described with reference to FIGS. 1-2, except that the mount includes dual function links. When the same element number is used in connection with FIGS. 3-6 as was used in FIGS. 1-2, it has the same meaning unless indicated otherwise. While the example mounts of FIGS. 3-7 are described as rear mounts (e.g., mounts coupled to a turbine casing, turbine frame etc.), the examples disclosed herein can also be used in conjunction with front mounts (e.g., mounts coupled to the compressor casing, an intermediate compressor casing, fan casing, front frame, fan frame etc.) and/or any suitable mounts of the engine.

Figure 3:
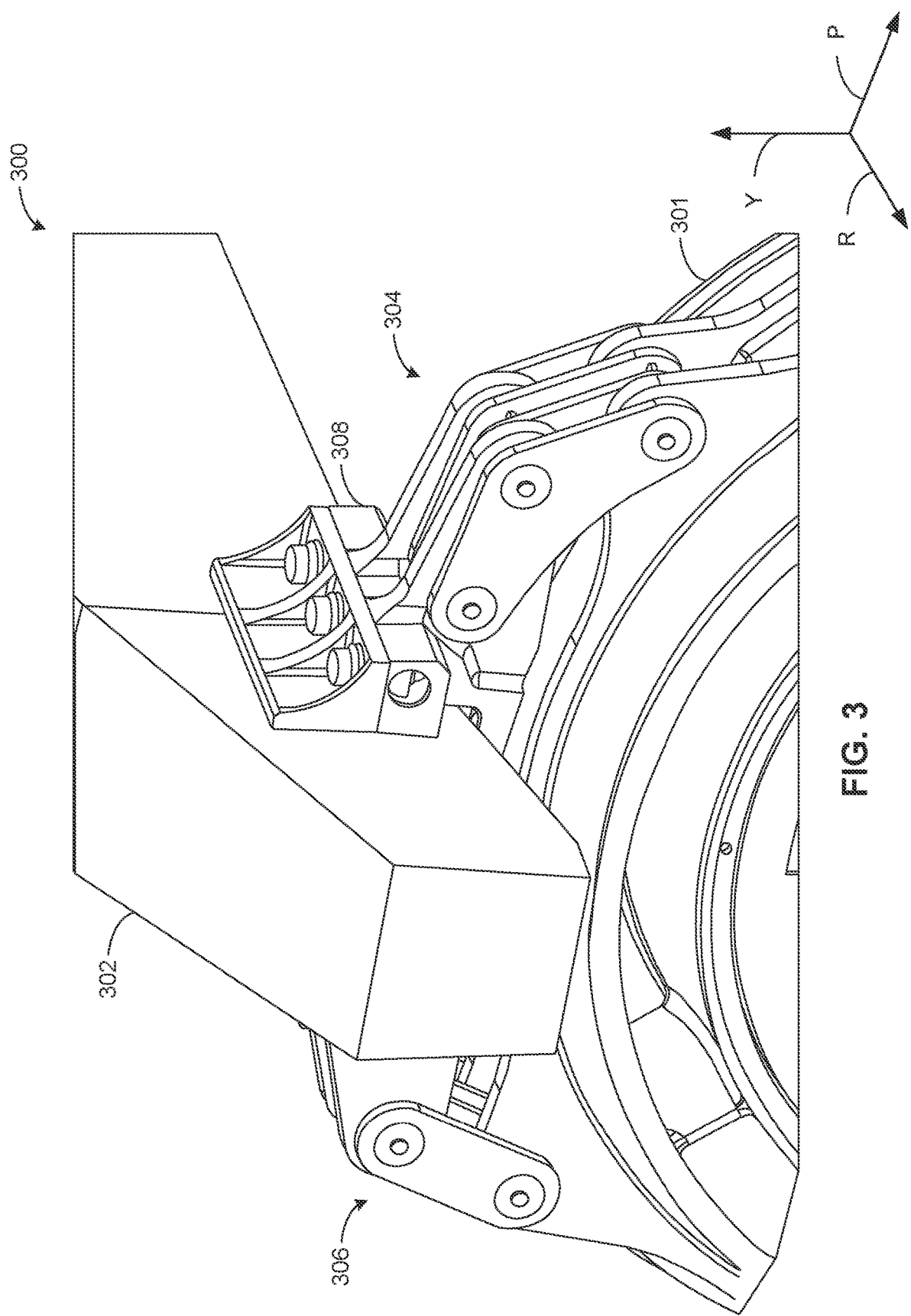
FIG. 3 illustrates a front view of a mount implemented in accordance with the teachings of this disclosure.

FIG. 3 illustrates a front view of a mount 300 implemented in accordance with the teachings of this disclosure. In the illustrated example of FIG. 3, the mount 300 couples an engine casing 301 to a pylon 302. In the illustrated example of FIG. 3, the mount 300 includes a first linkage 304, a second linkage 306, and a yoke 308. The engine casing 301 is coupled to the pylon 302 via the mount 300. The pylon 302 couples the engine casing 301 to a wing (not illustrated) of an aircraft (not illustrated).

The first linkage 304 is a three-pin dual linkage (e.g., a fixed link, etc.), and the second linkage 306 is a dual two-pin linkage (e.g., a swing link, etc.). Each of the linkage 304, 306 includes a primary load path and a secondary load path. The primary load path(s) bears load during the normal operation of the gas turbine engine and/or pylon 302, and the secondary load path does not bear load. If the primary load path no longer exists (e.g., a failure of the component of the primary load path, etc.), the secondary load path(s) begin to carry the load previously transferred via the primary load path. In FIG. 3, the primary load paths of the linkages 304, 306 are functionally independent. That is, if the primary load path of the first linkage 304 fails, the secondary load path of the first linkage 304 begins to transfer the load previously transferred by the primary load of the first linkage 304, and the primary load path of the second linkage 306 can continue to function unaffected by the failure of the primary load path of the first linkage 304. Example implementations of the linkages are described below in conjunction with FIGS. 5-6.

The forces and moments generated by the weight and operation of the gas turbine engine associated with the engine casing 301 are reacted between and/or by the mounts 300 and/or the other mounts of a gas turbine engine (e.g., a gas turbine engine similar to the gas turbine engine 100 of FIG. 1, etc.). In the illustrated example of FIG. 3, the mount 300 constrains three degrees of freedom of the coupled gas turbine engine by reacting to vertical loads, lateral loads, and moments about the roll axis. In some such examples, imbalances in vertical and/or lateral loads between the mount 300 and the other engine mounts can be used to react pitch and/or yaw moments applied to the gas turbine engine. These other mounts can include thrust links, front mounts and/or any other suitable connections between the gas turbine engine and the pylon 302.

Figure 4:
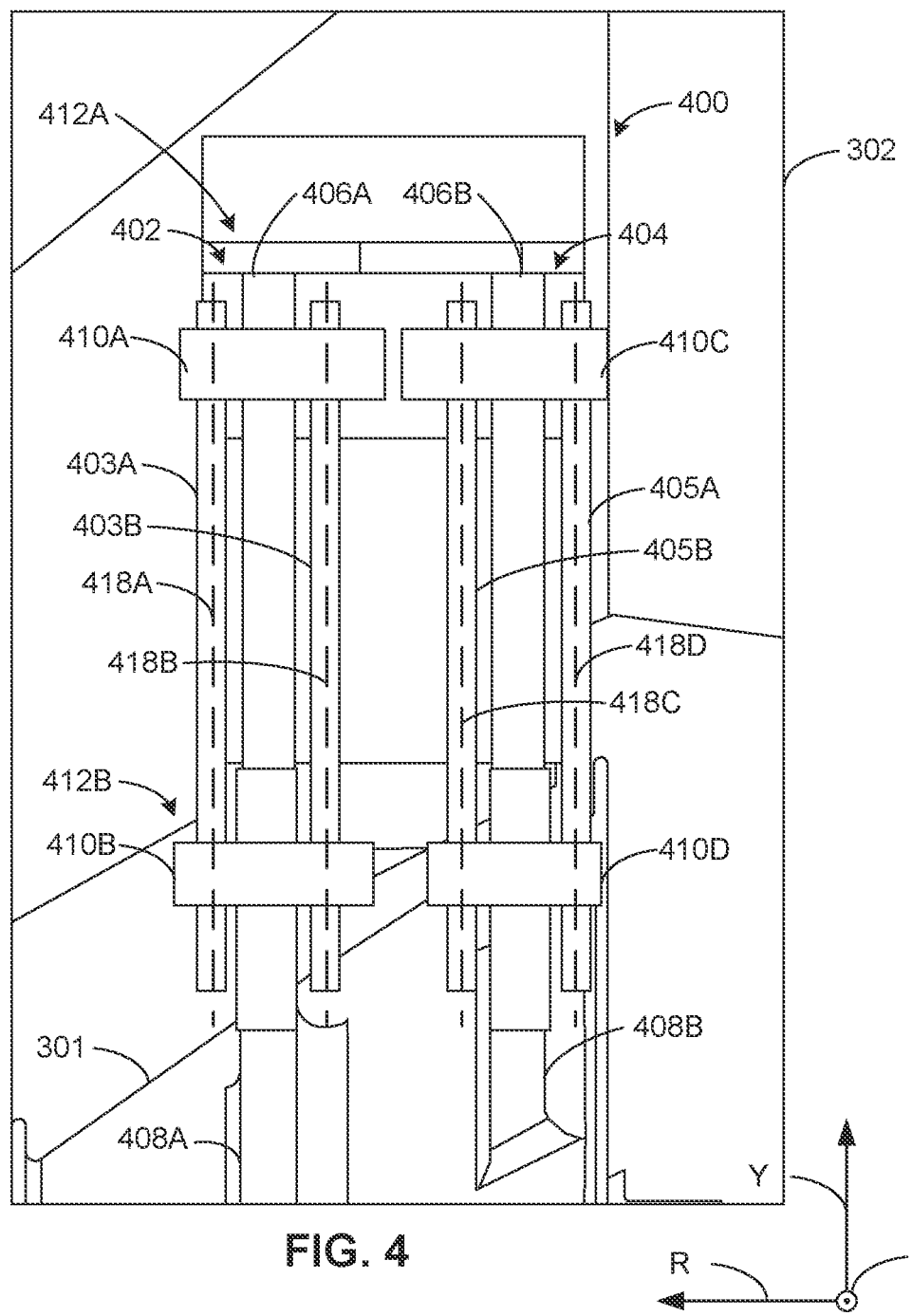
FIG. 4 illustrates a side view of the mount of FIG. 3.

FIG. 4 illustrates a side view of a linkage 400 than can be used to implement one or more of the linkages 304, 306 of the mount 300 of FIG. 3. In the illustrated example of FIG. 4, the linkage 400 includes an example first linkage portion 402 and an example second linkage portion 404. In FIG. 4, the first linkage portion 402 includes a first linkage member 403A and a second linkage member 403B. In FIG. 4, the second linkage portion 404 includes a third linkage member 405A and a fourth linkage member 405B. The first linkage portion 402 extends between a first pylon lug 406A and a first casing lug 408A. The second linkage portion 404 extends between a second pylon lug 406B and a second casing lug 408B. In the illustrated example of FIG. 4, the first linkage portion 402 is coupled to the lugs 406A, 408A via a first pin 410A and a second pin 410B. In the illustrated example of FIG. 4, the second linkage portion 404 is coupled to the lugs 406B, 408B via a third pin 410C and a fourth pin 410D, respectively. In the illustrated example of FIG. 4, the first linkage portion 402 includes example gaps 412A, 412B.

In some examples, the linkage members 403A, 403B, 405A, 405B can be composed of the same material (e.g., steel, titanium, aluminum, etc.) and have the same geometric properties (e.g., length, thickness, shape, etc.). In other examples, the linkage members 403A, 403B, 405A, 405B can be formed of different material and/or have different geometric properties. For example, the first linkage member 403A and the second linkage member 403B can have different material properties and/or geometric properties than the third linkage member 405A and the fourth linkage member 405B. In some such examples, the configuration of the linkage members 403A, 403B, 405A, 405B can cause the second linkage portion 404 to have a greater stiffness (e.g., a greater coefficient of stiffness, etc.) than the first linkage portion.

In FIG. 4, the first linkage member 403A defines a first plane 418A, the second linkage member 403B defines a second plane 418B, the third linkage member 405A defines a third plane 418C, and the fourth linkage member 405B defines a fourth plane 418D. Particularly, in the illustrated example of FIG. 4, the linkage members 403A, 403B, 405A, 405B are plates with primary surfaces in the planes 418A, 418B, 418C, 418D, respectively. The planes 418A, 418B, 418C, 418D exist in the yaw-pitch plane (e.g., perpendicular to the roll axis, etc.). Each of the planes 418A, 418B, 418C, 418D are parallel (e.g., the primary faces of the linkage members 403A, 403B, 405A, 405B are parallel, etc.). In other examples, the linkage members 403A, 403B, 405A, 405B and/or the planes 418A, 418B, 418C, 418D can have any other suitable orientation (e.g., angle, tilt, etc.) and/or relationship.

The first linkage member 403A, the second linkage member 403B, the first pylon lug 406A, and the first pin 410A form a first clevis. The first linkage member 403A, the second linkage member 403B, the first casing lug 408A, and the second pin 410B form a second clevis. The third linkage member 405A, the fourth linkage member 405B, the second pylon lug 406B, and the third pin 410C form a third clevis. The third linkage member 405A, the fourth linkage member 405B, the second casing lug 408B, and the fourth pin 410D form a fourth clevis. The first clevis, the second clevis, the third clevis, and the fourth clevis collectively couple the pylon 302 to the engine casing 202 (FIG. 2) via the linkage 400.

During normal operation, the load transferred by the linkage 400 is transferred by the second linkage portion 404 and is not transferred by the first linkage portion 402. In FIG. 4, the first linkage portion 402 does not transfer load due to the gaps 412A, 412B, which prevent first linkage portion 402 from reacting to the load between the first pylon lug 406A and the first casing lug 408A. Excessive loading, repeated loading, and/or material defects can cause the second linkage portion 404 to plastically deform and fail. If the second linkage portion 404 fails (e.g., is no longer able to transfer tensional loads, etc.), the weight of the gas turbine engine can cause the gaps 412A, 412B to close (e.g., disappear, etc.), which causes the first linkage portion 402 to transfer load. As such, the first linkage portion 402 acts as a failsafe linkage for the second linkage portion 404. In some examples, the second linkage portion 404 can act as a mechanical fuse. In some such examples, the second linkage portion 404 can be designed to fail (e.g., break, facture, etc.) at lower loads than the other components of the linkage 400. In some examples, the second linkage portion 404 can act as a mechanical fuse. In some such examples, the second linkage portion 404 can be designed to fail (e.g., break, facture, etc.) at lower loads than the other components of the linkage 400.

While the example of FIG. 4 is described with reference to a two-pin linkage (e.g., the linkage 306 of FIG. 3, etc.), the general design associated with FIG. 4 can also be used for a three-pin linkage (e.g., the first linkage 304 of FIG. 3, etc.). In such examples, the linkage 400 can include an additional connection to the pylon 302 with corresponding pins, gaps, and linkage portions to couple the engine casing 301 to the pylon 302.

Figure 5:
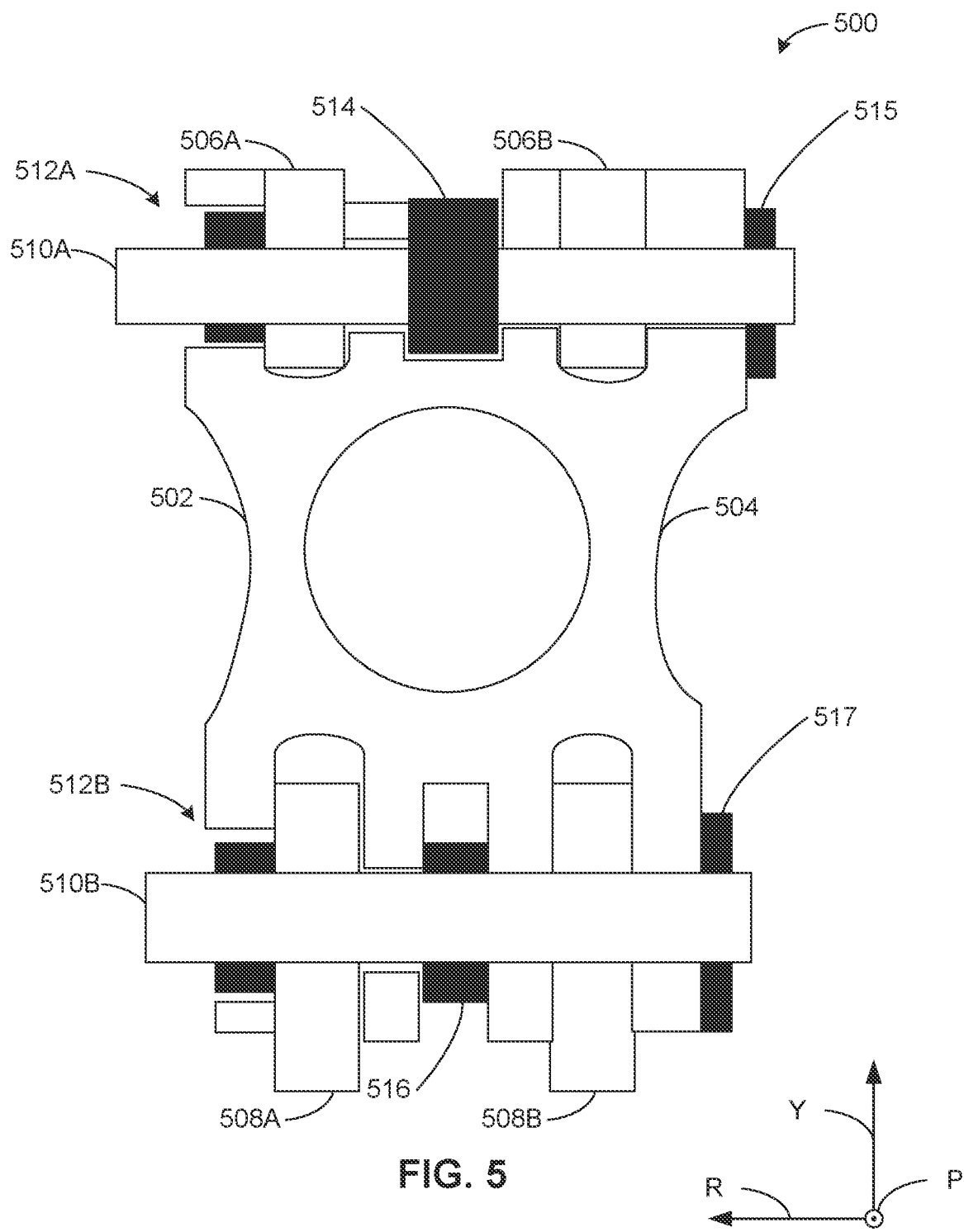
FIG. 5 illustrates a side view of another mount implemented in accordance with the teachings of this disclosure.

FIG. 5 illustrates a side view of another linkage 500 implemented in accordance with the teachings of this disclosure. The linkage 500 can, for example, be used to implement the second linkage 306 of FIGS. 3 and 4. In the illustrated example of FIG. 5, the linkage 500 includes an example first linkage portion 502 and an example second linkage portion 504. The first linkage portion 502 extends between a first pylon lug 506A and a first casing lug 508A. The second linkage portion 504 extends between a second pylon lug 506B and a second casing lug 508B. In the illustrated example of FIG. 5, the linkage 500 includes a first pin 510A that extends through the linkage portions 502, 504. In the illustrated example of FIG. 5, the second linkage portion 504 is coupled to the pylon lugs 506B, 508B via a second pin 510B. In the illustrated example of FIG. 5, the first linkage portion 502 includes gaps 512A, 512B. In the illustrated example of FIG. 5, the first pin 510A is retained in the linkage 500 by a first retention collar 514 and a second retention collar 515. The second pin 510B is retained in the linkage 500 by a third retention collar 516 and a fourth retention collar 517. In the illustrated example of FIG. 5, the linkage portions 502, 504 are unitary (e.g., each implemented as a single integral part, etc.). For example, the linkage portions 502, 504 can be manufactured via machining, additive manufacturing and/or casting as a single or unitary piece.

During normal operation, the load transferred by the linkage 500 is transferred by the second linkage portion 504 and is not transferred by the first linkage portion 502. In FIG. 5, the first linkage portion 502 does not transfer load due to the gaps 512A, 512B, which prevents first linkage portion 502 from reacting to a load between the pylon lugs 506A, 506B and the casing lugs 508A, 508B. Excessive loading, repeated loading, and/or material defects can cause the second linkage portion 504 to plastically deform and fail. If the second linkage portion 504 fails (e.g., is no longer able to transfer tensional loads, etc.), the weight of the gas turbine engine and/or forces associated aircraft maneuvers can cause the gaps 512A, 512B to close (e.g., disappear, etc.), which causes the first linkage portion 502 to transfer load. As such, the first linkage portion 502 acts a failsafe linkage for the second linkage portion 504. In some examples, the second linkage portion 504 can act as a mechanical fuse. In some such examples, the second linkage portion 504 can be designed to fail (e.g., break, fracture, collapse, etc.) at lower loads than the other components of the linkage 500. In some examples, the second gap 512B can be absent. In some examples, the first linkage portion 502 and the second linkage portion 504 can have the same material and geometric properties. In other examples, the first linkage portion 502 and the second linkage portion 504 can have different material and geometric properties. For example, the first linkage portion 502 can be manufactured to be more flexible than the second linkage portion 504 (e.g., by having different thicknesses and/or geometric properties, etc.). In some examples, the second linkage portion 504 can have a great stiffness (e.g., a greater coefficient of stiffness, etc.) than the first linkage portion 502. In some such examples, the first linkage portion 502 can act as a vibrational absorber. An example of a failure of the second linkage portion 504 failing is described below in conjunction with FIG. 6.

In illustrated example of FIG. 5, the linkage 500 includes the retention collars 514, 515, 516, 517 which retains the pins 510A, 510B within the linkage 500. For example, if the second linkage portion 504 fails, the physical features (not illustrated) of the pins 510A, 510B which may no longer retain the pins 510A, 510B. For example, the retention collars 514, 515, 516, 517 can retain the pins 510A, 510B via friction. In some examples, the retention collars 514, 515, 516, 517 can include features (not illustrated) that increase the friction between the retention collars 514, 515, 516, 517 and the pins 510A, 510B (e.g., teeth, a rough surface, etc.). In some examples, some of all of the pins 510A and 510B can include a circular groove which will engage with corresponding protruding portion(s) in the retention collars 514, 515, 516, 517 (not illustrated).

Figure 6:
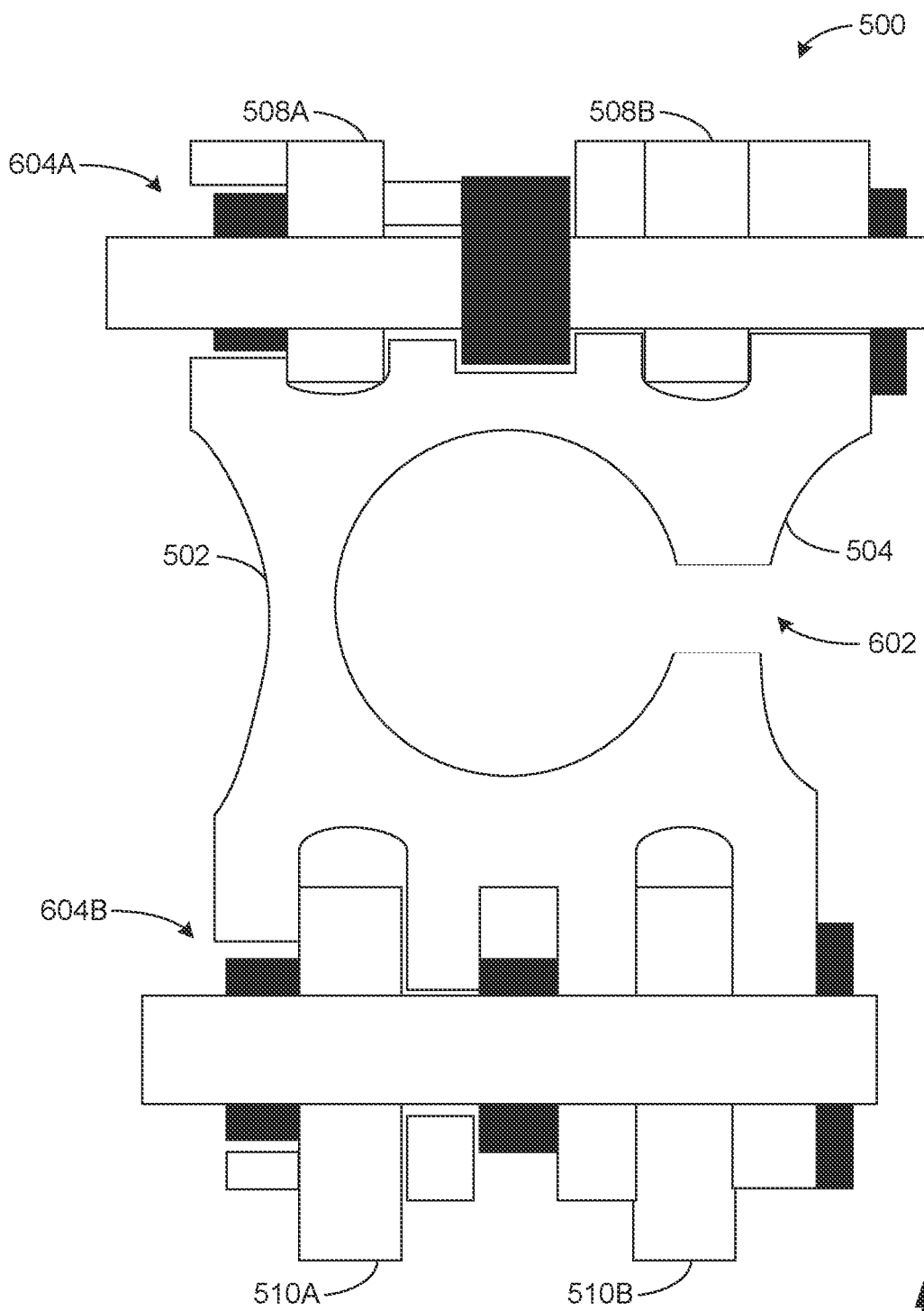
FIG. 6 illustrates a different side view of the mount of FIG. 5.
Figure 6:
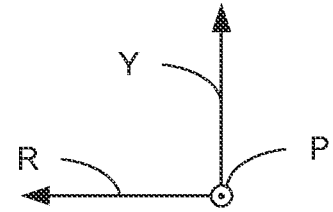

FIG. 6 illustrates a different side view of the front linkage 500 of FIG. 5 after the second linkage portion 504 has failed.

In FIG. 6, the second linkage portion 504 has undergone plastic deformation and fracture to form a gap 602. For example, the second linkage portion 504 can fail due to excessive loading, material defects and/or fatigue from repeated loading. In FIG. 6, the gaps 512A, 512B (not illustrated) have closed to form contacts 604A, 604B, causing the first linkage portion 502 to carry transfer load between the pylon lugs 506A, 506B and the casing lugs 508A, 508B. As described in conjunction with FIG. 5, the second linkage portion 504 can have different material properties and/or geometric properties than the first linkage portion 502, which cause the second linkage portion 504 to absorb vibrations from the pylon lugs 506A, 506B and/or the casing lugs 508A, 508B.

The gap 602 formed by the fracturing can allow the second linkage portion 504 to transfer vertical loads and/or lateral loads in compression. That is, the if the gas turbine engine and/or casing exerts a compression load on the pylon, the gap 602 can close, allowing second linkage portion 504 to continue to transfer compression loads after fracture. In some examples, the fractured second linkage portion 504 can function as a bumper.

Examples disclosed herein include mounts with a dual-linkage arrangement with integrated fail-safe linkages. The examples disclosed herein mitigate the need for standalone failsafe links allowing decreasing the packaging space requirement and weight of the mount system. Examples disclosed can reduce the weight of gas turbine engines and/or enable the coupling of additional components between the pylon and gas turbine engine. Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Further aspects of the invention are provided by the subject matter of the following clauses:

An apparatus for mounting a casing of a gas turbine engine to a pylon, the apparatus comprising a first pin and a linkage including a first linkage portion including a first pin, a second linkage portion, the second linkage portion forming a first load path between the gas turbine engine and the pylon, the second linkage portion arranged with respect to the first linkage portion such that a gap prevents the first linkage portion from forming a second load path between the gas turbine engine and the pylon.

The apparatus of any of the preceding clauses, wherein the gap is configured to close when the first portion fails, the closing of the gap causing the second load path to form.

The apparatus of any of the preceding clauses, wherein, when the first portion fails, the first portion is configured to function as a bumper.

The apparatus of any of the preceding clauses, wherein the first portion has a first stiffness and the second portion has a second stiffness, the second stiffness less than the first stiffness.

The apparatus of any of the preceding clauses, wherein the first portion and the second portion are unitary.

The apparatus of any of the preceding clauses, further including a second pin, and wherein the first portion and the first pin are configured to form a first clevis with the pylon, the first portion and the second pin are configured to form a second clevis with the casing, the second portion and the first pin are configured to form a third clevis with the pylon, and the second portion and the second pin are configured to form a fourth clevis with the casing.

The apparatus of any of the preceding clauses, further including a retention collar disposed between the first portion and the second portion, the retention collar retaining the first pin.

The apparatus of any of the preceding clauses, further including a second pin, and wherein the first portion further includes a first member, and a second member, the first member and the second member forming a first clevis with the first pin and the pylon, the first member and the second member forming a second clevis with the second pin and the casing.

The apparatus of any of the preceding clauses, further including a third pin and a fourth pin and wherein the first portion further includes a third member; and a fourth member, the third member and the fourth member forming a third clevis with the third pin and the pylon, the third member and the fourth member forming a fourth clevis with the second pin and the casing.

The apparatus of any of the preceding clauses, wherein the first member defines a first plane, the second member defines a second plane, the third member defines a third plane, the fourth member defines a fourth plane, and the first plane, the second plane, the third plane, and the fourth plane are parallel.

A gas turbine engine coupled to a pylon, the gas turbine defining a roll axis, a yaw axis, and a pitch axis, the gas turbine engine comprising a casing, a mount to couple the casing to the pylon, the mount comprising a first pin, and a linkage including a first portion forming a first load path between the gas turbine engine and the pylon, the first load path including the first pin, and a second portion, the second portion arranged with respect to the first portion such that a gap prevents the second portion from forming a second load path between the gas turbine engine and the pylon.

The gas turbine engine of any of the preceding clauses, wherein the gap is configured to close when the first or second portion fails, the closing of the gap causing the second load or first load path to form.

The gas turbine engine of any of the preceding clauses, wherein, when the first portion fails, the first portion is configured to function as a bumper.

The gas turbine engine of any of the preceding clauses, wherein the first portion has a first stiffness and the second portion has a second stiffness, the second stiffness less than the first stiffness.

The gas turbine engine of any of the preceding clauses, wherein the first portion and the second portion are unitary.

The gas turbine engine of any of the preceding clauses, wherein the mount further includes a second pin, and wherein the first portion and the first pin are configured to form a first clevis with the pylon, the first portion and the second pin are configured to form a second clevis with the casing, the second portion and the first pin are configured to form a third clevis with the pylon; and the second portion and the second pin are configured to form a fourth clevis with the casing.

The gas turbine engine of any of the preceding clauses, wherein the mount further includes a retention collar disposed between the first portion and the second portion, the retention collar retaining the first pin.

The gas turbine engine of any of the preceding clauses, wherein the mount further includes a second pin, and wherein the first portion further includes a first member, and a second member, the first member and the second member forming a first clevis with the first pin and the pylon, the first member and the second member forming a second clevis with the second pin and the casing.

The gas turbine engine of any of the preceding clauses, wherein the mount further includes a third pin and a fourth pin and wherein the first portion further includes a third member, and a fourth member, the third member and the fourth member forming a third clevis with the third pin and the pylon, the third member and the fourth member forming a fourth clevis with the second pin and the casing.

The gas turbine engine of any of the preceding clauses, wherein the first member defines a first plane, the second member defines a second plane, the third member defines a third plane, the fourth member defines a fourth plane, and the first plane, the second plane, the third plane, and the fourth plane are parallel.

An apparatus for mounting a casing of a gas turbine engine to a pylon, the apparatus comprising a first means for coupling and a first means for linking including a first means for load transferring forming a first load path between the gas turbine engine and the pylon, the first load path including the first pin and a second means for load transferring, the second means for load transferring arranged with respect to the first means for load transferring such that a gap prevents the second portion from forming a second load path between the gas turbine engine and the pylon.

The following claims are hereby incorporated into this Detailed Description by this reference, with each claim standing on its own as a separate embodiment of the present disclosure.

What is claimed is:

1. An apparatus to mount a casing of a gas turbine engine to a pylon, the apparatus comprising:
    a first pin; and
    a linkage including:
        a first linkage portion including the first pin, the first linkage portion having a first stiffness; and
        a second linkage portion, the second linkage portion forming a first load path between the gas turbine engine and the pylon, the second linkage portion arranged with respect to the first linkage portion such that a gap prevents the first linkage portion from forming a second load path between the gas turbine engine and the pylon, the second linkage portion having a second stiffness, the second stiffness less than the first stiffness.

2. The apparatus of claim 1, wherein the gap is configured to close when the first linkage portion fails, the closing of the gap causing the second load path to form.

3. The apparatus of claim 2, wherein, when the first linkage portion fails, the first linkage portion is configured to function as a bumper.

4. The apparatus of claim 1, wherein the first linkage portion and the second linkage portion are unitary.

5. The apparatus of claim 4, further including a second pin, and wherein:
    the first linkage portion and the first pin are configured to form a first clevis with the pylon;
    the first linkage portion and the second pin are configured to form a second clevis with the casing;
    the second linkage portion and the first pin are configured to form a third clevis with the pylon; and
    the second linkage portion and the second pin are configured to form a fourth clevis with the casing.

6. The apparatus of claim 1, further including a retention collar disposed between the first linkage portion and the second linkage portion, the retention collar retaining the first pin.

7. The apparatus of claim 1, further including a second pin, and wherein the first linkage portion further includes:

a first member; and a second member, the first member and the second member forming a first clevis with the first pin and the pylon, the first member and the second member forming a second clevis with the second pin and the casing.

8. The apparatus of claim 7, further including a third pin and a fourth pin and wherein the second linkage portion further includes:

a third member; and a fourth member, the third member and the fourth member forming a third clevis with the third pin and the pylon, the third member and the fourth member forming a fourth clevis with the fourth pin and the casing.

9. The apparatus of claim 8, wherein:

the first member defines a first plane;

the second member defines a second plane;

the third member defines a third plane;

the fourth member defines a fourth plane; and the first plane, the second plane, the third plane, and the fourth plane are parallel.

10. A gas turbine engine coupled to a pylon, the gas turbine engine defining a roll axis, a yaw axis, and a pitch axis, the gas turbine engine comprising:

a casing;

a mount to couple the casing to the pylon, the mount including:

a first pin; and a first linkage portion including the first pin; and a second linkage portion, the second linkage portion forming a first load path between the gas turbine engine and the pylon, the second linkage portion arranged with respect to the first linkage portion such that a gap prevents the first linkage portion from forming a second load path between the gas turbine engine and the pylon, wherein the first linkage portion and the second linkage portion are unitary.

11. The gas turbine engine of claim 10, wherein the gap is configured to close when the first linkage portion fails, the closing of the gap causing the second load path to form.

12. The gas turbine engine of claim 10, wherein, when the first linkage portion fails, the first linkage portion is configured to function as a bumper.

13. The gas turbine engine of claim 10, wherein:

the first linkage portion having a first stiffness; and the second linkage portion having a second stiffness, the second stiffness less than the first stiffness.

14. The gas turbine engine of claim 10, wherein the mount further includes a second pin, and wherein:

the first linkage portion and the first pin are configured to form a first clevis with the pylon;

the first linkage portion and the second pin are configured to form a second clevis with the casing;

the second linkage portion and the first pin are configured to form a third clevis with the pylon; and the second linkage portion and the second pin are configured to form a fourth clevis with the casing.

15. The gas turbine engine of claim 10, wherein the mount further includes a retention collar disposed between the first linkage portion and the second linkage portion, the retention collar retaining the first pin.

16. The gas turbine engine of claim 10, wherein:

the first linkage portion has a first stiffness; and the second linkage portion has a second stiffness, the second stiffness less than the first stiffness.

17. A gas turbine engine coupled to a pylon, the gas turbine engine defining a roll axis, a yaw axis, and a pitch axis, the gas turbine engine comprising:

a casing;

a mount to couple the casing to the pylon, the mount including:

a first pin;

a second pin;

a third pin; and a fourth pin;

a first linkage portion including the first pin, the first linkage portion including:

a first member; and a second member, the first member and the second member forming a first clevis with the first pin and the pylon, the first member and the second member forming a second clevis with the second pin and the casing;

a second linkage portion, the second linkage portion forming a first load path between the gas turbine engine and the pylon, the second linkage portion arranged with respect to the first linkage portion such that a gap prevents the first linkage portion from forming a second load path between the gas turbine engine and the pylon, the second linkage portion further including;

a third member; and a fourth member, the third member and the fourth member forming a third clevis with the third pin and the pylon, the third member and the fourth member forming a fourth clevis with the fourth pin and the casing.

18. The gas turbine engine of claim 17, wherein:

the first member defines a first plane;

the second member defines a second plane;

the third member defines a third plane;

the fourth member defines a fourth plane; and the first plane, the second plane, the third plane, and the fourth plane are parallel.

19. The gas turbine engine of claim 17, wherein the gap is configured to close when the first linkage portion fails, the closing of the gap causing the second load path to form.

20. The gas turbine engine of claim 17, wherein the first member and the third member are at least one of (1) composed of a different material or (2) have a different geometric property.

* * * * *